United States Patent [19]

Nixon

[11] Patent Number: 5,081,171

[45] Date of Patent: Jan. 14, 1992

[54] COMPOSITION FOR SEALING OF PAINTED OR METAL SURFACES

[76] Inventor: Charles R. Nixon, 16025 Redington Dr., Redington Beach, Fla. 33708

[21] Appl. No.: 311,150

[22] Filed: Feb. 14, 1989

[51] Int. Cl.$^5$ .................. C08K 5/54; C08L 27/18
[52] U.S. Cl. .................. 524/188; 524/265; 524/546
[58] Field of Search ............ 524/546, 261, 262, 506, 524/188, 265; 427/13, 387

[56] References Cited

U.S. PATENT DOCUMENTS

| | | | |
|---|---|---|---|
| 3,560,249 | 2/1971 | Chereshkevich et al. | 427/13 |
| 3,925,292 | 12/1975 | Holmes | 524/546 X |
| 3,968,069 | 7/1976 | Grimand et al. | 524/546 X |
| 4,104,225 | 8/1978 | Combere | 524/546 X |
| 4,284,668 | 8/1981 | Nixon | 427/355 |

OTHER PUBLICATIONS

Dow Corning, "A Guide to Dow Corning ® Silicones for Polish Formulators", Form No. 22-637A-79, 1979.
Dow Corning, "Information About Polish Ingredients", Form No. 22-240A-78, 1978.
Dow Corning, Material Safety Data Sheet for "Dow Corning ® 531 Fluid", May 15, 1987.
Dow Corning, Material Safety Data Sheet for "Dow Corning ® 536 Fluid", Mar. 26, 1990.

*Primary Examiner*—Evan Lawrence
*Attorney, Agent, or Firm*—Volpe & Koenig

[57] ABSTRACT

A liquid composition for protecting a positively charged surface, the composition comprising: negatively charged polytetrafluoroethylene polymer resin particles and at least one member of the group consisting of methyltrimethoxysilane and an amino functional polysiloxane; whereby the negatively charged polytetrafluoroethylene molecules fuse to the surface upon exposure to ambient temperatures above about 68 degrees Fahrenheit.

8 Claims, No Drawings

COMPOSITION FOR SEALING OF PAINTED OR METAL SURFACES

BACKGROUND OF THE INVENTION

This invention relates to sealants for metal or painted surfaces, including the gel coat on fiberglass, to protect the surfaces from corrosion and other damaging environmental effects. The present invention is particularly useful as a paint sealant for automobiles, airplanes or boats.

Unprotected painted surfaces and unpainted metal surfaces are damaged by exposure to the environment by the action of ultra-violet and infra-red rays of the sun, acid rain, salt, insects and other harmful elements. There have been numerous products developed for protecting painted surfaces, such as waxes, activated silicone polyethylene polymers and, as described in U.S. Pat. No. 4,284,668, tetrafluoroethylene polymers.

In the process described in the above U.S. patent, a paint sealant composition in the form of a tetrafluoroethylene monomer and an abrasive compound are applied to the painted surface. The surface is then buffed so that the buffing action in conjunction with the abrasive compound produces sufficient heat to polymerize the tetrafluoroethylene monomer, thereby creating a protective layer of polymer over the painted surface.

It has been found in practice that the utilization of the abrasive and buffing action requires substantial skill by the applicator, and that improper application of the composition results in damage to the paint or removal of the paint from the surface. Furthermore, a three-step process is involved, namely cleaning the surface, applying the tetrafluoroethylene monomer, and eventually applying a protective coating.

SUMMARY OF THE INVENTION

The present invention is directed towards novel protective compositions and a method of applying same to a painted surface, including gel coats of fiberglass surfaces, or unpainted metal surface. The protective composition comprises negatively charged polytetrafluoroethylene (hereinafter "PTFE") polymer resin particles, preferably in an aqueous dispersion in the form of a hydrophobic colloid with resin particles of about 0.05 to about 0.5 microns or larger in size.

Before application of the protective composition, the painted or metal surface is positively charged, preferably with a novel cleaning composition which removes any trapped sediments and insolvents from the pores in the paint or metal surface and which leaves the surface positively charged by virtue of using a cationic surfactant containing electropositive ions.

The molecules of PTFE resin, which are negatively charged, i.e. containing negative ions, are pulled down into the pores in the surface of the paint or metal in view of the electrostatic attraction between the negatively charged molecules and the positively charged surface. As the treated surface is allowed to cure in a warm environment, the PTFE resin molecules elongate, causing them to physically interlock themselves to each other and fuse into the paint or metal surface.

The PTFE is inert to most harmful elements except halogen fluorene. In particular the action of ultra-violet and infra-red rays, photolysis, acidic and alkaline chemicals are resisted by the PTFE protective coating. The present invention therefore provides durability and resistance to the damaging effect of environmental elements, in combination with a very simple method of application.

DETAILED DESCRIPTION OF THE PREFERRED EMBODIMENT

The invention involves applying a novel protectant composition to a positively charged painted or metal surface. In the following detailed description, reference will be made to painted surfaces for convenience, but it should be clearly understood that the description is equally applicable to unpainted metal surfaces and gel-coated fiberglass surfaces.

The surface is positively charged, preferably by using a novel cleaning composition to prepare the surface prior to application of the protective coating, the cleaning composition including a cationic surfactant. Once the surface has been cleaned and positively charged, the protective coating is applied.

The cleaning solution is produced by dissolving a mixture of organic acid crystals, cationic surfactants, water treatment compounds and certain other ingredients in an aqueous solution, as described in greater detail below.

The preferred ingredients of the cleaning composition are as follows:
(a) 20 to 50% by weigh organic acid crystals, such as oxtail acid;
(b) approximately 20-40% by weight of cationic surfactants, such as sodium carbonate, sodium silicates or preferably stearyl dimethylbenzyl ammonium chloride quaternary comound or other cationic surfactant;
(c) 24-40% by weight of a mixture of sodium alkybenzenesulfonates, proteinase an sodium perborate; and
(d) 1-15% by weight of water treatment compounds such as water softeners, oxygen bleach and/or sodium sulfate.

When a newly pained surface is curing, entrapped solvents evaporate from eh bottom of the paint up, and sediment is left in the pores after any vapors escape during evaporation. The organic acid crystals int eh cleaning composition tend to side solve this sediment. The acid crystals also remove any form of metallic oxides, sulfur and oxides of nitrogen which are connected into sulfuric and nitric acids in the atmosphere, that have formed on the painted surface due to industrial or environmental conditions.

The cationic surfactants act as a foaming agent to bring the dissolved sediments from the pores or craters and surface of the paint to the surface and to leave the surface with a positive charge.

The sodium alkybenzenesulfonates, sodium perborate and proteinase act in combination to remove the olefins and fatty acids which may have formed on the painted surface.

To demineralize the water, treatment compounds are added in order to compensate for the various water types found in different parts of the world.

To prepare the cleaning solution, approximately three ounces (weight) of the blended cleaning powder, consisting of compounds (a) to (d) noted above, is added to one gallon of warm water (140 to 180 degrees Fahrenheit) and dissolved. For lesser strengths, the amount of water is increased, thereby diluting the prepared solution. If desired the cleaning solution can be prepared by mixing the various compounds in the form of a concentrated liquid solution as opposed to a powder.

Before applying the cleaning solution, it is allowed to cool in order that the solution can be applied by hand. The solution is then applied to the entire surface to be prepared, using a sponge, a soft cloth, a long-handled soft-bristled brush, or preferably, a hand mitt. After application of the cleaning solution, 10 to 15 minutes is allowed to elapse, in order to permit the solution to dissolve the sediments and acids left in the pores and on the surface. When crystallization commences on the surface, it is an indication that sediments and other contaminants have been removed from the pores of the painted surface. The surface is then thoroughly rinsed with water to remove the crystallized or powdery substance on the surface, and is then dried with a chamois cloth. It is important that the cloth used to dry the surface not have been washed in any detergent, as that will leave a greasy film on the prepared surface.

Through application of the cleaning solution, the pores of the paint are thoroughly purged of sediments and the surfaces are generally free of all nitrogen oxides ($NO_x$), acid rain, sulfur dioxides ($SO_2$), chemical impurities, fatty acids, detergents and any waxes, polishes, burnishing or buffing agents. The surface has a dull and lacklustre appearance, and bears a positive charge due to the action of the cleaning solution, specifically the cationic surfactants.

Though the above surface preparation is preferred, any alternative preparation could be used, the essential features of the preparation being that the surface should be reasonably clean, and must be positively charged. How the cleaning is effected and how the positive charges are produced is not material to the invention as broadly defined.

After this surface preparation, the protective coating can be applied.

The preferred protective coating composition is:
 (a) PTFE polymer resin aqueous dispersion in the form of a negatively charged hydrophobic colloid with resin particles of about 0.05 to about 0.5 microns or larger in size, stabilized with 6% by weight of non-ionic wetting agent. The size of the resin particles varies in order to have the resin particles effectively penetrate the pores of the painted surface. Preferably there should be a mixture of about 75%–25% of small to large size particles. The composition has a pH of about 10 and a viscosity at room temperature of 20 Centipoise. The colloidal suspension of polymer resin constitutes approximately 0.6 to 1.75% by weight of the overall protective composition;
 (b) 1 to 2.75% by weight of methyltrimethoxysilane primarily for durability, and also for detergent resistance of the protective coating when cured;
 (c) 3 to 9% by weight of an aminofunctional polysiloxane in the form of an aminodimethyl polysiloxane, primarily for ease of application and detergent resistance, as well as improving the gloss and rub-out of the protective coating;
 (d) 2% by weight of a phenyl propyl silsesquioxame, primarily as a reactive intermediate which, when blended with other silicone resins will improve the hardness and durability, as well as improving the gloss;
 (e) 6 to 12% by weight of calcined kaolin clay, for its mild abrasiveness to smooth the surface to be polished and remove streaks and blotches and assist the bonding process;
 (f) 1 to 3% anhydrous aluminum silicate, for its slightly greater abrasiveness, to give a higher polish and deeper gloss;
 (g) 17 to 25% of an aliphatic solvent, to form a water and oil emulsion;
 (h) 0.75 to 2% of a non-ionic surfactant emulsifier;
 (i) 0.5 to 1.25% isosteric acid, to prevent water vapour and corrosive pollutants (e.g. from acid rain) from passing through the polish film, an important feature in view of today's environmental acid content; and
 (j) a rheological control agent such as bentone clay optionally added in amounts of about 1% to control the viscosity of the protective composition;
all in a demineralized aqueous solution of amines, preferably ethylene diamine tetra acetic acid ("EDTA"), comprising the balance of the composition representing 40.25 to 67.15% by weight of the total composition. The non-ionic surfactant, aliphatic solvent and demineralized aqueous solution form a water and oil emulsion which in conjunction with the amines (EDTA) in the aqueous solution neutralizes the acidic contaminants and improve the film cure.

The method of preparation of the protective solution is important. The following steps are required:
 (a) Mix the phenyl propyl silsesquixome with 75% ethanol alcohol roughly four to six hours before starting in order to provide sufficient time for the phenyl propyl silsesquioxame crystals to dissolve;
 (b) Prepare the demineralized aqueous solution by adding the amines, preferably EDTA, to the water;
 (c) Add the calcined kaolin clay and anhydrous aluminum silicate to the aqueous solution, agitating, and then add the aliphatic solvent and non-ionic surfactant, continuing agitation;
 (d) Add the aminodimethyl polysiloxane and methyltrimethoxysilane solution, continuing agitation, initially at about 1200 rpm;
 (e) Add the rheological control agent to obtain the desired viscosity, continuing to agitate the mixture;
 (f) Once everything else has dissolved, add the phenyl propyl silsesquioxame and methyl alcohol solution;
 (g) Add isosteric acid, 0.5 to 1.25% by weight, continue to agitate for five minutes;
 (h) Add the PTFE colloidal suspension, decreasing the rpm of agitation to 700 or less rpm, agitate for five minutes, and then decant.

With the surface and its pores carefully cleaned and rinsed, and bearing positive charges, the surface is in condition to receive the protective coating with its small polarized negative particles of PTFE resin. These resin particles are electrostatically attracted into the purged craters and onto the painted surfaces. As the resins are pulled down into the craters, they tend to overcrowd themselves into these areas. Because the minute particles of PTFE resins elongate with any change in temperature from about 68 degrees Fahrenheit and up, they are soon permanently fused into the paint.

The protective solution is applied in small amounts to an applicator cloth and rubbed onto the prepared surface using a clockwise circular motion until the entire surface has been treated. The solution is allowed to cure and plate for five minutes, and is then rinsed off with clean water. The water improves the curing process of the solution. The surface is dried with a clean detergent-free chamois, to take off any excess water. The surface is then placed either outside in the sun or kept in a warm heated area to permit the resin particles to elongate and the protective coating to cure. It is important to apply moisture to the protective coating soon after application.

As noted previously, the polarized molecules of PTFE resins are electrostatically attracted into the craters and surface of the paint, and become fused into the paint or metal surface. While the PTFE resin is fusing itself into the paint due to the elongation of the resins, the protective coatings are physically binding and cross-linking themselves through their ability to plate over the PTFE resins, physically locking them in until enough heat is generated by either the sun or ambient temperature to effect the elongation of the PTFE molecules. The more that the surface is exposed to heat, the more the elongation of the PTFE resins occur. The resins do not have a memory, and therefore they continue to grow as they are subjected to more heat. Each resin particle can expand over one hundred times its original size, resulting in penetration and fusion into the painted surface. The protective plating of the amino-functional polysiloxanes keeps the resins locked in. Because the painted surface is sealed with PTFE resins the aminofunctional polysiloxanes cannot drift through the elongated PTFE resins, providing the surface with a higher degree of durability than previously known. The PTFE resins are inert to all elements except halogen fluorene, and accordingly the colours of the paint pigments can cure to their fullest over a long period of time. When paint surfaces have not been treated with PTFE resins, the aminofunctional polysiloxanes drift through the paint and primer, leaving the surfaces exposed to the elements and therefore subject to rapid deterioration.

Although various embodiments of the present invention are described herein in metail, it would be appreciated by those skilled in the art that variations may be made thereto without departing from the scope of the inventions and scope of the appended claims.

What is claimed is:

1. A liquid composition for protecting a positively charged surface, said composition comprising: negatively charged polytetrafluoroethylene polymer resin particles and at least one member of the group consisting of methyltrimethoxysilane and an amino functional polysiloxane; whereby the negatively charged polytetrafluoroethylene molecules fuse to the surface upon exposure to ambient temperatures above about 68 degrees Fahrenheit.

2. A composition as recited in claim 1, in which said polytetrafluoroethylene particles are in the form of a negatively chared hydrophobic colloid suspended in an aqueous solution.

3. A composition as recited in claim 2, in which said resin particles vary in size from about 0.05 microns to about 0.5 microns.

4. A composition as recited in claim 3, in which said colloidal suspension of polytetrafluoroethylene comprises approximately 0.6 to 1.75% by weight of the composition.

5. A composition as recited in claim 2, further comprising at least one of the following, namely:
   (a) penyl propoyl silsesquioxanmes;
   (b) calcined kaoline clay;
   (c) anhydrous aluminum silicate;
   (d) an aliphatic solvent;
   (e) a non-ionic sufactant; and
   (f) isostearic acid.

6. A composition as recited in claim 4, comprising approximately:
   1 to 2.75% by weight of methyltrimeth-oxysilane;
   3 to 9% by weight of aminodimethyl polysiloxane;
   and further comprising:
   (a) 2% by weight of phenyl propyl silsesquioames;
   (b) 6 to 12% by weight o calcined kaolin clay;
   (c) 1 to 3% by weight anhydrous aluminum silicate;
   (d) 17 to 25% by weight of an aliphatic solvent;
   (e) 0.75 to 2% by weight of a non-ionic sufactant; and
   (f) 0.5 to 1.25% by weight isostearic acid.

7. A composition as recited in claim 6, all in an aqueous solution of amines, namely ethylene diamine tetra acetic acid, representing 40.25–67.15% by weight of the composition.

8. A composition as recited in claim 7, further comprising a rheological control agent in amounts of up to about 1%.

* * * * *

UNITED STATES PATENT AND TRADEMARK OFFICE
CERTIFICATE OF CORRECTION

PATENT NO. : 5,081,171
DATED : January 14, 1992
INVENTOR(S) : Charles R. Nixon

It is certified that error appears in the above-identified patent and that said Letters Patent is hereby corrected as shown below:

At column 2, line 27, delete "weigh" and insert therefor --weight of--.

At column 2, line 28, delete "oxtail" and insert therefor --oxalic--.

At column 2, line 34, delete "24" and insert therefor --20--.

At column 2, line 35, delete "an" and insert therefor --and--.

At column 2, line 40, delete "pained" and insert therefor --painted--.

At column 2, line 41, delete "eh" and insert therefor --the--.

At column 2, line 43, delete "int eh" and insert therefor --in the--.

At column 2, line 44, delete "side solve" and insert therefor --dissolve--.

At column 2, line 46-47, delete "connected" and insert therefor --converted--.

At column 5, line 39, delete "metail" and insert therefor --detail--.

UNITED STATES PATENT AND TRADEMARK OFFICE
CERTIFICATE OF CORRECTION

PATENT NO. : 5,081,171

DATED : January 14, 1992

INVENTOR(S) : Charles R. Nixon

It is certified that error appears in the above-identified patent and that said Letters Patent is hereby corrected as shown below:

In claim 2, column 6, line 10, delete "chared" and insert therefor --charged--.

In claim 5, column 6, line 21, delete "penyl propoyl silsesquioxanmes" and insert therefor --phenyl propyl silsesquioxanes--; line 22, delete "kaoline" and insert therefor --kaolin--; line 25, delete "sufactant" and insert therefor --surfactant--.

In claim 6, column 6, line 29, delete "methyltrimeth-oxysilane" and insert therefor --methyltrimethoxysilane--; line32, delete "silsesquioames" and insert therefor --silsesquioxanes--; line 33, delete "o" and insert therefor --of--; line 36, delete "sufactant" and insert therefor --surfactant--.

Signed and Sealed this

Twenty-seventh Day of April, 1993

Attest:

MICHAEL K. KIRK

Attesting Officer

Acting Commissioner of Patents and Trademarks